United States Patent
Leute et al.

[15] 3,697,535
[45] Oct. 10, 1972

[54] 4,5-DIHYDROIMIDAZOLINE-3-OXIDE-1-OXYL

[72] Inventors: Richard K. Leute, Mountain View; Edwin F. Ullman, Atherton, both of Calif.

[73] Assignee: Synvar Associates,, Palo Alto, Calif.

[22] Filed: Dec. 15, 1969

[21] Appl. No.: 885,332

[52] U.S. Cl. .................260/299, 260/309.5, 23/230
[51] Int. Cl. .............................................C07d 105/00
[58] Field of Search............................260/309.5, 299

Primary Examiner—Alex Mazel
Assistant Examiner—Jose Tovar
Attorney—Townsend and Townsend

[57] ABSTRACT

4,5-dihydroimidazoline-3-oxide-1-oxyl-2-yl mercuric compounds having tertiary carbon atoms in the number 4 and 5 positions of the imidazoline ring. Typical is 4,4,5,5-tetramethylimidazoline-3-oxide-1-oxyl-2-yl mercuric chloride.

9 Claims, No Drawings

4,5-DIHYDROIMIDAZOLINE-3-OXIDE-1-OXYL

This invention relates to stable free radical dihydroimidazolines. More particularly, it relates to such imidazolines having a mercuric group substituted on the C₂ carbon atom of the imidazoline ring and to methods for their synthesis.

In accordance with the present invention a new group of imidazoline mercuric compounds are provided having the formula

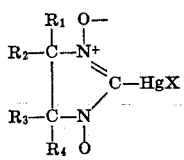

wherein each of $R_1$, $R_2$, $R_3$, $R_4$ is an alkyl group, an alkenyl group, an alkynyl group, or an aryl group, each of about one to 12 carbon atoms or forms part of an alkylene or alkenylene group $R_1$–$R_2$ or $R_3$–$R_4$, said alkylene and alkenylene groups each having about three to 10 carbon atoms; and X is a ligand for mercury selected from the group consisting of halogen atoms and nitrate, hydroxyl, amino, alkoxy, acyloxy, aryloxy, thioalkoxy, thioacyloxy, thioaryloxy, aryl, and alkyl groups.

Compounds of the foregoing group are useful as antioxidants and for the measurement of weak magnetic fields by known techniques. The free radical structure of the compounds causes them to exhibit electron spin resonance (ESR). In their preferred utility the compounds are therefore employed as "spin labels" for attachment to biologically active molecules. This type of utility is more fully described in U.S. Pat. application Ser. No. 496,622 filed Oct. 15, 1965, now U.S. Pat. No. 3,489,522.

The compounds of this invention may be prepared from compounds of the formula:

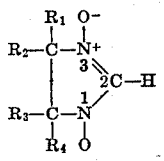

with $R_1$, $R_2$, $R_3$ and $R_4$ having the previously stated definitions. These starting materials are disclosed and claimed in co-pending Pat. application Ser. No. 740,055 filed June 26, 1968, now abandoned said disclosure being incorporated by reference herein. The simplest case is where $R_1$, $R_2$, $R_3$ and $R_4$ are each a methyl group and this structure will be used to illustrate the present invention hereinafter. The symbol

will be used to indicate the case where $R_1$, $R_2$, $R_3$, $R_4$ are each methyl together with the two carbon atoms to which the methyl groups are bonded. The present invention is concerned with replacing only the hydrogen atom on the C₂ carbon atom of the imidazoline ring with a mercuric group. The nature of $R_1$, $R_2$, $R_3$ and $R_4$ is of no particular relevance to this substitution and all of the various structures described in application Ser. No. 740,055 could be present instead of the methyl groups used here for illustration with no difference being required in the method used for obtaining the mercuric compound sought. Whatever the nature of $R_1$, $R_2$, $R_3$, and $R_4$ in the starting compound, the same will also be found in the product made according to this invention.

In one aspect of the present discovery, compounds of this invention can be prepared by reacting

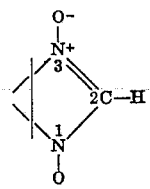

(hereinafter referred to as the "hydrogen substituted radical") with an ionizable mercuric salt. The mercuric atom and the anion of the salt replace the hydrogen atom on the C₂ carbon atom in an electrophilic substitution reaction. Any ionizable mercuric salt can be utilized for this reaction with the anion of the particular salt selected serving as the ligand X in the general formula given above. The reaction is run in a highly polar non-protonic solvent such as the following preferred group: dimethyl sulfoxide, hexamethyl phosphoramide, tetrahydrofuran, dimethoxyethane and diethyl ether. In addition, a strong base preferably having a pKa of above 18 is utilized so as to be present in an amount of not less than a 1:1 molar ratio with respect to the hydrogen substituted radical. A preferred group of strong bases includes alkali metal tert-alkoxides such as sodium or potassium tert-butoxide or tert-amyloxide. Other preferred strong bases include the anion derived from dimethyl sulfoxide, sodium hydride, sodium triphenyl methide, and alkali-metal amides and alkyl-substituted amides such as butyl lithium and phenyl lithium.

The following example illustrates this reaction. In all examples temperatures are in centigrade degrees.

EXAMPLE I 4,4,5,5-tetramethylimidazoline-3-oxide-1-oxyl-2-yl mercuric iodide

A mixture of 157 mg of 4,4,5,5-tetramethylimidazoline-1-oxide-3-oxyl, 910 mg of mercuric iodide, 160 mg of potassium tert-butoxide, and 10 ml of dry tetrahydrofuran was stirred at room temperature for 15 minutes. At this time an additional 160 mg of potassium tert-butoxide was added and stirring was continued for an additional 30 minutes. The mixture was then diluted with 50 ml of water and extracted with three 4 ml portions of methylene chloride. The extracts were dried over magnesium sulfate and evaporated in vacuo. Reprecipitation of the residue from methylene chloride by dilution with hexane yielded the product, m.p. 154–155 (decomp.).

Other examples of ionizable mercuric salts which can be substituted for the mercuric iodide in Example I to obtain an analogous mercuric compound in which the particular anion associated with the mercuric atom is obtained as the ligand X in the product instead of the iodide of Example I include:
- Mercuric chloride
- Mercuric bromide
- Mercuric fluoride
- Mercuric nitrate
- Mercuric acetate
- Mercuric phosphate
- Mercuric sulfate
- Mercuric cyanide Where the ligand X desired is an acyloxy or aryloxy group, the compounds of this invention are more easily obtained in that a mercuric salt of the corresponding carboxylic acid is heated in acidic media with the hydrogen substituted radical to substitute a mercuric acyloxy or aryloxy group for the hydrogen atom. In this case the nature of the solvent is relatively unimportant and, of course, the strong base is not used. An example of this procedure is as follows

EXAMPLE II 4,4,5,5-tetramethylimidazoline-3-oxide-1-oxyl-2-yl mercuric acetate To a solution of 1.88 g of 4,4,5,5-tetramethylimidazoline-3-oxide-1-oxyl in 40 ml of methylene chloride was added 3.83 g of mercuric acetate, 10 drops of acetic acid and 10 drops of acetic anhydride. The mixture was boiled for 10 minutes and the solvent was then evaporated. The oily residue was taken up in 20 ml of acetonitrile and filtered, and the filtrate was allowed to stand at −20° overnight. The crystalline product (1.3 g) was collected and the filtrate evaporated in vacuo. Addition of benzene to the residue followed by filtration and evaporation of the filtrate yielded an additional 1.8 g of product as the residue. Total yield, 3.1 g (62 percent).

Anal. Calcd. for $C_9H_{15}N_2O_4Hg$ = C, 26.00; H, 3.63; N, 6.73; Hg, 48.24. Found: C, 26.75; H, 4.00; N, 6.81; Hg, 45.91.

Instead of mercuric acetate in the above example, the following different mercuric salts of carboxylic acids could be substituted which will result in a mercuric compound having the selected acyloxy or aryloxy present as the ligand X instead of the acetoxy group shown in Example II.

$Hg(C_6H_5COO)_2$

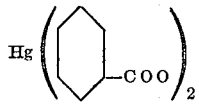

$Hg[(CH_3)_2CHCOO]_2$
$Hg(ClC_6H_4COO)_2$
$Hg(CH_5(CH_2)_5COO)_2$
$Hg(OOC(CH_2)_4COO)$
$Hg(OOCCOO)$
$Hg[(C_6H_4(COO)_2]$
$Hg[CH_3CH_2CH(C_6H_5)COO]_2$

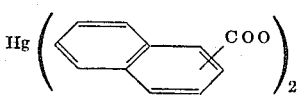

$Hg(O_2NC_6H_4COO)_2$
$Hg(CH_3OOCCH_2CH_2COO)_2$
$Hg(BrC_6H_4CH_2COO)_2$
$Hg[H_2NCOCH_2CH(CH_3)COO]_2$
$Hg(NCCH_2C_6H_4COO)_2$
$Hg(CH_3OCH_2COO)_2$
$Hg(CF_3COO)_2$
$Hg(CCl_3COO)_2$
$Hg(CH_3COCH_2CH_2COO)_2$

Another procedure for obtaining compounds of this invention is to use as a starting material one of the compounds of this invention having a particular ligand X and exchanging the existing ligand X for a different ligand X. In this aspect of the invention the mercuric compound of this invention is placed in a suitable solvent and contacted with an ionizable salt, a weak organic acid, an alcohol, phenol, amine or diaryl or dialkyl mercuric compound, the portion of the selected member which is to serve as a ligand X being different than the ligand X of the starting compound.

Where a non-mercuric salt is employed whose anion is different than X and is to be exchanged therewith, the anion should preferably have a greater affinity for the mercury atom than the existing ligand X. Where a mercury salt is used, the affinity of the anion for the mercury atom becomes unimportant. In a preferred use of this reaction it has been found that where the existing X is an acetate group, exchange is readily obtained with most ionizable salts. An example of this reaction is as follows.

EXAMPLE III 4,4,5,5-tetramethylimidazoline-3-oxide-1-oxyl-2-yl mercuric chloride A mixture of 200 mg of the mercuric acetate radical obtained in Example II, 1 g of lithium chloride and 5 ml of dry tetrahydrofuran was stirred for 15 minutes at room temperature. The mixture was then filtered and the residue was washed with two 10 ml portions of methylene chloride. The combined solutions were evaporated in vacuo and the residue was crystallized from 10 ml of acetonitrile to give 135 mg (72 percent) of the red brown radical, m.p. 131–132 (decomp.)

Anal. Calcd. for $C_2H_{12}N_2O_2HgCl$: C, 21.44; H, 3.09; N, 7.15. Found: C, 21.47; H, 3.12; N, 6.96.

Instead of the substitution of chloride for acetate, the mercuric acetate radical of Example II can be placed in water and the hydroxyl group will be substituted for the acetate group. Other anionic substituents that become bonded to mercury when starting with salts and the acetate radical of Example II include compounds of this invention in which X represents anions such as nitrate, halide, azide, perchlorate, sulfate, phosphate, alkyl carboxylates, aryl carboxylates, aryloxides sulfonates, etc. Further, replacement of the acetate group by any amino, alkoxy, aryloxy, aryl carboxylate, alkyl carboxylate, thioalkoxy, thioaryloxy, N-hydroxylamino, N-acylhydroxylamino, or polyfunctional chelating group is obtained by using primary or secondary amine, an alcohol, a phenol, an aryl or alkyl carboxylic acid, an alkyl or aryl thiol, a hydroxylamine, hydroxamic acid or polyfunctional chelating agent in place of the lithium chloride of Example III. Thus the following compounds can be added to the mercuric acetate radical in accordance with Example III to replace the acetate group with an amino, alkoxy, aryloxy, acyloxy, thioalkoxy, thioaryloxy, N-hydroxylamino, N-acylhydroxylamino, or chelating group of the compound selected.

H₂O
C₂H₅OH
C₆H₅OH
CH₃C₆H₄COOH
(C₂H₅)₂NH
C₆H₅NHCH₃
C₂H₅OOCCH₂CH₂SH
(CH₃)₃CCOSH

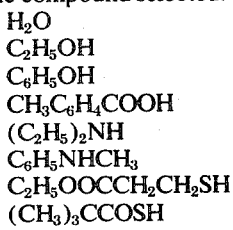

CH₃(CH₂)₃COOH
(CH₃)₃CCH₂SH
ClC₆H₄NH₂
CH₃CH(CH₃)CH₂NH₂
H₂NCOCOOH

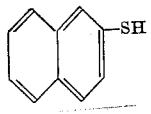

O₂NC₆H₄SH
CH₃CH(OH)=CHCOOH₃
(CH₃)₂NCH₂CH₂NH₂
(CH₃)₂NCH₂COOH
(HOOCCH₂)₂NCH₂CH₂N(CH₂COOH)₂

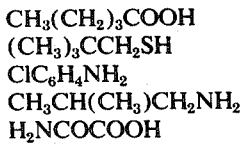

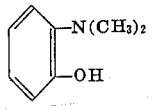

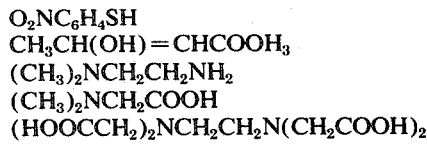

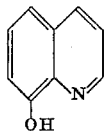

(CH₃)₃CNHOH

In cases where the ligand X desired is attached to mercury by a carbon-mercury bond, the corresponding lisand carbanion may be combined in a non-protonic solvent with the mercuric acetate radical or other mercury substituted radical bearing a weakly bound lisand. Possible ligand carbanions that may be employed are derived from phenyl sodium, methyl magnesium iodide, butyl lithium, sodium triphenyl methide, sodium acetylide, etc. In the following example the carbanion is derived from the potassium salt of the hydrogen substituted radical.

EXAMPLE IV

Bis-(4,4,5,5-tetramethylimidazoline-3-oxide-1-oxyl-2-yl) mercury

To a mixture of 300 mg of potassium tert-butoxide in 5 ml of dry tetrahydrofuran was added under nitrogen a solution of 157 mg of 4,4,5,5-tetramethylimidazoline-3-oxide-1-oxyl in 10 ml of the same solvent. A solution of 416 mg of 4,4,5,5-tetramethylimidazoline-1-oxide-3-oxyl-2-yl mercuric acetate in 15 ml of tetrahydrofuran was added and the mixture was stirred for 1 hour. The mixture was then diluted with 50 ml of water and extracted with three 50 ml portions of methylene chloride. The combined organic layers were dried and evaporated in vacuo to yield 355 mg of a residue. Reprecipitation of this residue from methylene chloride with hexane yielded the pure purple biradical; m.p. 186° (decomp.)

Anal. Calcd. for $C_{14}H_{24}N_4O_4Hg = C, 32.78; H, 4.22; N, 10.98$. Found: C, 32.23; H, 4.68; N, 10.70.

This compound readily forms complexes with chelating agents such as o-phenanthroline, tetramethylethylenediamine, 2,2'-bipyridyl, etc.

Another exchange situation is created by contacting an existing mercury substituted radical with a ligand formed by a mercury-carbon bond with a diaryl or dialkyl mercuric compound with the understanding that the existing compound has a ligand X that is different than the alkyl or aryl group of the dialkyl or diaryl mercuric compound. An example of this type is as follows.

EXAMPLE V 4,4,5,5-tetramethylimidazoline-3-oxide-1-oxyl-2-yl phenyl mercury

A solution of 100 mg of the biradical described in Example IV and 69 mg of diphenyl mercury in 5 ml of methylene chloride was boiled for 1 hour. The solvent was evaporated in vacuo and the residue chromatographed on silica gel with 1:1 methylenechloride-ether. Evaporation of the solvent and trituration of the residue with methylcyclohexane yielded a crystalline solid. Recrystallization from benzene-methylcyclohexane yielded 60 mg; m.p. 162–163° (decomp.).

Anal. Calcd. for $C_{13}H_{12}N_2O_2Hg$: C, 35.98; H, 3.96; N, 6.46. Found: C, 36.43; H, 4.09; N, 6.43.

Other suitable dialkyl and diaryl compounds which could be utilized in the foregoing example instead of diphenyl mercury are as follows:

dimethyl mercury
dibutyl mercury
dicyclohexyl mercury
dibenzyl mercury
dinaphthyl mercury
dicarbethoxyphenyl mercury
bis-(3-hexenyl) mercury
bis-(methoxybenzyl) mercury
bis-(chloroethylphenyl) mercury
bis-(dimethylamino-ethyl) mercury Although the foregoing invention has been described in some detail by way of illustration for purposes of clarity of understanding, it will be apparent to one skilled in this art that certain changes and modifications may be practiced within the spirit of this invention as limited only by the scope of the appended claims.

What is claimed is:

1. An imidazoline of the formula

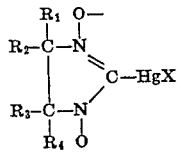

wherein $R_1$ through $R_4$ are alkyl of one to 12 carbon atoms, X is halogen, nitrate, sulfate, perchlorate, phosphate, alkyl sulfonate, aryl sulfonate or the acyl group of an organic carboxylic acid.

2. Imidazoline in accordance with claim 1 wherein X is acyloxy.

3. Imidazoline in accordance with claim 2 wherein said acyloxy group is acetoxy.

4. Imidazoline in accordance with claim 1 wherein X is a halogen.

5. Imidazoline in accordance with claim 1 wherein $R_1$, $R_2$, $R_3$ and $R_4$ are each a methyl group.

6. Imidazoline in accordance with claim 5 wherein X is acetoxy.

7. Imidazoline in accordance with claim 5 wherein X is chlorine.

8. Imidazoline in accordance with claim 5 wherein X is iodine.

9. Imidazoline in accordance with claim 5 wherein X is 4,4,5,5-tetramethylimidazoline-3-oxide-1-oxyl-2-yl.

* * * * *